(12) United States Patent
Ahn

(10) Patent No.: US 12,206,895 B2
(45) Date of Patent: *Jan. 21, 2025

(54) INTRA-FRAME PREDICTION-BASED VIDEO CODING METHOD AND DEVICE

(71) Applicant: INTELLECTUAL DISCOVERY CO., LTD., Seoul (KR)

(72) Inventor: Yong Jo Ahn, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,397

(22) Filed: Oct. 20, 2022

(65) Prior Publication Data

US 2023/0079957 A1 Mar. 16, 2023

Related U.S. Application Data

(63) Continuation of application No. 17/258,066, filed as application No. PCT/KR2019/008504 on Jul. 10, 2019, now Pat. No. 11,509,932.

(30) Foreign Application Priority Data

Jul. 11, 2018 (KR) ........................ 10-2018-0080822

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .... H04N 19/593; H04N 19/105; H04N 19/11; H04N 19/117; H04N 19/119; H04N 19/157; H04N 19/176; H04N 19/182
See application file for complete search history.

(56) References Cited

U.S. PATENT DOCUMENTS

2017/0332084 A1* 11/2017 Seregin ................ H04N 9/8045
2017/0347128 A1* 11/2017 Panusopone ......... H04N 19/172
(Continued)

FOREIGN PATENT DOCUMENTS

| CN | 103329538 A | 9/2013 |
|---|---|---|
| CN | 104853197 A | 8/2015 |

(Continued)

OTHER PUBLICATIONS

Office Action for CN 201980046208.8 by China National Intellectual Property Administration dated Jul. 19, 2023.
(Continued)

*Primary Examiner* — Francis Geroleo
(74) *Attorney, Agent, or Firm* — BROADVIEW IP LAW, PC

(57) ABSTRACT

A video coding/decoding method and device, according to the present invention, may enable: deriving an intra-frame prediction mode of a current block; configuring a reference pixel for the intra-frame prediction of the current block; and carrying out the intra-frame prediction of the current block on the basis of the intra-frame prediction mode and the reference pixel. The intra-frame prediction mode of the current block is derived on the basis of any one of MPM candidates or a predetermined default mode.

13 Claims, 8 Drawing Sheets

(51) Int. Cl.
*H04N 19/11* (2014.01)
*H04N 19/117* (2014.01)
*H04N 19/119* (2014.01)
*H04N 19/157* (2014.01)
*H04N 19/176* (2014.01)
*H04N 19/182* (2014.01)

(52) U.S. Cl.
CPC ......... *H04N 19/117* (2014.11); *H04N 19/119* (2014.11); *H04N 19/157* (2014.11); *H04N 19/176* (2014.11); *H04N 19/182* (2014.11)

(56) References Cited

U.S. PATENT DOCUMENTS

| | | | |
|---|---|---|---|
| 2018/0098064 A1* | 4/2018 | Seregin | H04N 19/159 |
| 2018/0288425 A1* | 10/2018 | Panusopone | H04N 19/103 |
| 2019/0222837 A1 | 7/2019 | Lee et al. | |
| 2019/0238841 A1* | 8/2019 | Lee | H04N 19/176 |
| 2019/0313116 A1* | 10/2019 | Lee | H04N 19/119 |
| 2020/0154103 A1* | 5/2020 | Heo | H04N 19/11 |
| 2021/0160487 A1* | 5/2021 | Kim | H04N 19/593 |

FOREIGN PATENT DOCUMENTS

| | | |
|---|---|---|
| CN | 107925759 A | 4/2018 |
| JP | 2018-042263 A | 3/2018 |
| KR | 10-2013-0045149 A | 5/2013 |
| KR | 10-2014-0124443 A | 10/2014 |
| KR | 10-2017-0120538 A | 10/2017 |
| KR | 10-2018-0075660 A | 7/2018 |
| WO | 2017/190288 A1 | 11/2017 |
| WO | 2018/016823 A1 | 1/2018 |

OTHER PUBLICATIONS

International Search Report for PCT/KR2019/008504 dated Oct. 15, 2019 [PCT/ISA/210].

Written Opinion for PCT/KR2019/008504 dated Oct. 15, 2019 [PCT/ISA/237].

Notice of Allowance for CN 201980046208.8 by China National Intellectual Property Administration dated Sep. 10, 2024.

* cited by examiner

INTRA-FRAME PREDICTION-BASED VIDEO CODING METHOD AND DEVICE

CROSS-REFERENCE TO RELATED APPLICATIONS

This application is a continuation of a currently pending U.S. application Ser. No. 17/258,066 filed on Jan. 5, 2021, which is a national phase entry of an expired PCT International Application No. PCT/KR2019/008504, filed on Jul. 10, 2019, which claims priority to Korean Patent Application No. 10-2018-0080822 filed on Jul. 11, 2018, the entire contents of which are hereby incorporated by references in its entirety.

TECHNICAL FIELD

The present invention relates to video coding techniques. In particular, the present invention relates to intra prediction among video coding techniques.

BACKGROUND ART

The market demand for high-resolution video is increasing, and accordingly, a technology capable of efficiently compressing high-resolution images is required. In response to such market demand, ISO/IEC's Moving Picture Expert Group (MPEG) and ITU-T's VCEG (Video Coding Expert Group) jointly formed JCT-VC (Joint Collaborative Team on Video Coding), High Efficiency Video Coding (HEVC) video compression standard was developed in January 2013, and research and development for the next generation compression standard have been actively conducted.

Video compression is largely composed of intra prediction, inter prediction, transform, quantization, entropy coding, in-loop filter. Meanwhile, as the demand for high-resolution images increases, the demand for 3D image contents as a new image service is also increasing. Discussion is underway on a video compression technique for effectively providing 3D video contents with high-resolution and ultra-high-resolution.

DISCLOSURE

Technical Problem

An object of the present invention is to provide an image encoding/decoding method and apparatus with improved efficiency.

Another object of the present invention is to provide a method and apparatus for deriving an intra prediction mode.

In addition, an object of the present invention is to provide a method and apparatus for configuring a reference pixel for intra prediction.

In addition, an object of the present invention is to provide a method and apparatus for filtering a reference pixel.

In addition, an object of the present invention is to provide an intra prediction/correction method and apparatus.

In addition, an object of the present disclosure is to provide a computer-readable recording medium storing a bitstream generated by the image encoding method/apparatus.

Technical Solution

A video encoding/decoding method and apparatus according to the present invention may derive an intra prediction mode of a current block, configure a reference pixel for intra prediction of the current block, and perform the intra prediction of the current block based on the intra prediction mode and the reference pixel.

In the video encoding/decoding method and apparatus according to the present invention, the intra prediction mode is derived based on one of a predetermined default mode or an MPM candidate.

A video encoding/decoding method and apparatus according to the present invention may decode, from a bitstream, a first flag indicating whether the current block uses the default mode.

In the video encoding/decoding method and apparatus according to the present invention, when the current block uses the default mode according to the first flag, the intra prediction mode of the current block is set to the default mode.

In the video encoding/decoding method and apparatus according to the present invention, the intra prediction mode is derived based on a candidate list and an MPM index, the candidate list includes N MPM candidates, and N is 3, 4, 5, or 6.

In the video encoding/decoding method and apparatus according to the present invention, the intra prediction mode is changed by adding or subtracting a predetermined offset.

In the video encoding/decoding method and apparatus according to the present invention, the offset is selectively applied based on at least one of a shape of the current block or the derived intra prediction mode.

In the video encoding/decoding method and apparatus according to the present invention, the reference pixel belongs to one of a plurality of pixel lines neighboring to the current block.

A video encoding/decoding method and apparatus according to the present invention may filtering the reference pixel.

In the video encoding/decoding method and apparatus according to the present invention, the filtering is selectively performed based on a second flag indicating whether the filtering is performed on the reference pixel, and the second flag is derived based on at least one of a position/region of the reference pixel, a block size, a component type, whether intra prediction in sub-block units is applied, or an intra prediction mode.

In the video encoding/decoding method and apparatus according to the present invention, when the intra prediction mode of the current block is a DC mode, a pixel of the current block is predicted as an average value of the reference pixel.

In the video encoding/decoding method and apparatus according to the present invention, a range of the reference pixel for the DC mode is determined in consideration of at least one of a size or a shape of the current block.

In the video encoding/decoding method and apparatus according to the present invention, when a width of the current block is greater than a height of the current block, a pixel of the current block is predicted as an average value of top reference pixels of the current block, and when the width of the current block is less than the height, the pixel of the current block is predicted as an average value of left reference pixels of the current block.

In the video encoding/decoding method and apparatus according to the present invention, the predicted pixel of the current block is corrected based on a predetermined neighboring pixel and a weight.

In the video encoding/decoding method and apparatus according to the present invention, the current block is divided into a plurality of sub-blocks based on predetermined division information, and the intra prediction is performed in units of the sub-blocks.

Advantageous Effects

The present invention can provide an efficient method and apparatus for deriving an intra prediction mode.

In addition, according to the present invention, coding efficiency can be improved by configuring an adaptive reference pixel.

In addition, the present invention can improve the performance of intra prediction by using the filtered reference pixel.

Further, the present invention can improve the accuracy of intra prediction through intra prediction/correction.

Further, a computer-readable recording medium for storing a bitstream generated by the image encoding method/apparatus according to the present disclosure may be provided.

BEST MODE

Figure 1:
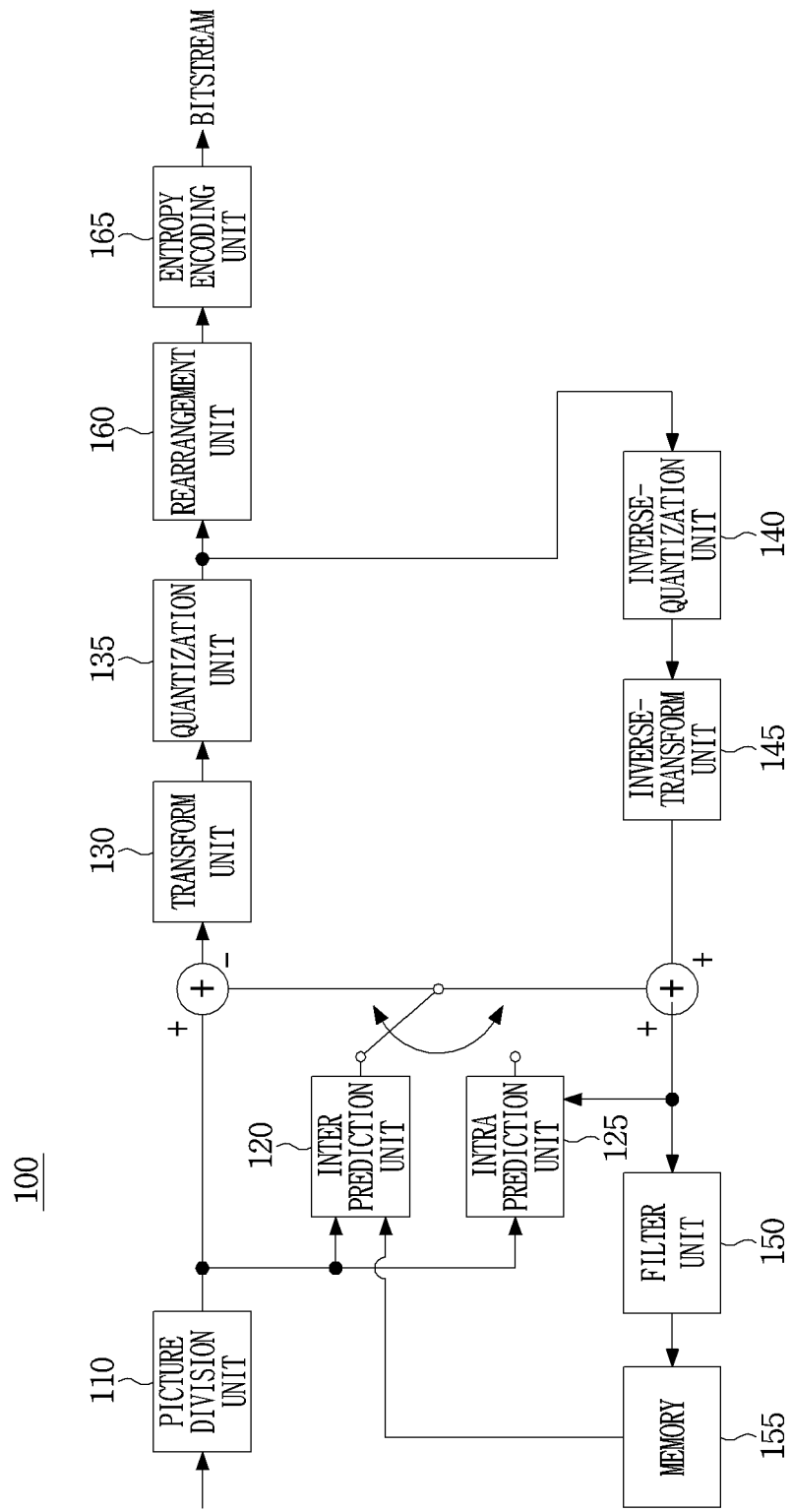
FIG. 1 is a block diagram illustrating an image encoding apparatus according to the present disclosure.

A video encoding/decoding method and apparatus according to the present invention may derive an intra prediction mode of a current block, configure a reference pixel for intra prediction of the current block, and perform the intra prediction of the current block based on the intra prediction mode and the reference pixel.

In the video encoding/decoding method and apparatus according to the present invention, the intra prediction mode is derived based on one of a predetermined default mode or an MPM candidate.

A video encoding/decoding method and apparatus according to the present invention may decode, from a bitstream, a first flag indicating whether the current block uses the default mode.

In the video encoding/decoding method and apparatus according to the present invention, when the current block uses the default mode according to the first flag, the intra prediction mode of the current block is set to the default mode.

In the video encoding/decoding method and apparatus according to the present invention, the intra prediction mode is derived based on a candidate list and an MPM index, the candidate list includes N MPM candidates, and N is 3, 4, 5, or 6.

In the video encoding/decoding method and apparatus according to the present invention, the intra prediction mode is changed by adding or subtracting a predetermined offset.

In the video encoding/decoding method and apparatus according to the present invention, the offset is selectively applied based on at least one of a shape of the current block or the derived intra prediction mode.

In the video encoding/decoding method and apparatus according to the present invention, the reference pixel belongs to one of a plurality of pixel lines neighboring to the current block.

A video encoding/decoding method and apparatus according to the present invention may filtering the reference pixel.

In the video encoding/decoding method and apparatus according to the present invention, the filtering is selectively performed based on a second flag indicating whether the filtering is performed on the reference pixel, and the second flag is derived based on at least one of a position/region of the reference pixel, a block size, a component type, whether intra prediction in sub-block units is applied, or an intra prediction mode.

In the video encoding/decoding method and apparatus according to the present invention, when the intra prediction mode of the current block is a DC mode, a pixel of the current block is predicted as an average value of the reference pixel.

In the video encoding/decoding method and apparatus according to the present invention, a range of the reference pixel for the DC mode is determined in consideration of at least one of a size or a shape of the current block.

In the video encoding/decoding method and apparatus according to the present invention, when a width of the current block is greater than a height of the current block, a pixel of the current block is predicted as an average value of top reference pixels of the current block, and when the width of the current block is less than the height, the pixel of the current block is predicted as an average value of left reference pixels of the current block.

In the video encoding/decoding method and apparatus according to the present invention, the predicted pixel of the current block is corrected based on a predetermined neighboring pixel and a weight.

In the video encoding/decoding method and apparatus according to the present invention, the current block is divided into a plurality of sub-blocks based on predetermined division information, and the intra prediction is performed in units of the sub-blocks.

MODE FOR DISCLOSURE

Embodiments of the present disclosure will be described in detail with reference to the accompanying drawings in the present specification so that those of ordinary skill in the art can easily implement the present disclosure. The present disclosure may, however, be embodied in many different forms and should not be construed as limited to the embodiments set forth herein. In order to clearly illustrate the present disclosure, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

In addition, terms such as first and second may be used to describe various components, but the components should not be limited by the terms. These terms are used only for the purpose of distinguishing one component from another component.

In addition, in the embodiments of the apparatus and method described herein, some of the components of the apparatus or some of the steps of the method may be omitted. In addition, the order of some of the components of the apparatus or the order of some of the steps of the method may be changed. In addition, other components or other steps may be inserted in some of the components of the apparatus or in some of the steps of the method.

In addition, some of the components or steps of the first embodiment of the present disclosure may be added to the second embodiment of the present disclosure, or may replace some of the components or steps of the second embodiment.

In addition, the components shown in the embodiments of the present disclosure are shown independently to indicate different characteristic functions, and do not mean that each component is composed of separate hardware or one software component unit. That is, for convenience of description, each component is listed as each component, and at least two components of each component may be combined to form one component, or one component may be divided into a plurality of components to perform a function. The integrated and separated embodiments of each of these components are also included in the scope of the present disclosure without departing from the essence of the present disclosure.

First, the terms used in the present application will be briefly described as follows.

The decoding apparatus (Video Decoding Apparatus), which will be described later, may be a civil security camera, a civil security system, a military security camera, a military security system, a personal computer (PC), a notebook computer, a portable multimedia player (PMP), a wireless communication terminal, a smart phone, a apparatus included in a server terminal such as a TV application server and a service server, and may mean a user terminal such as various apparatus, a communication apparatus such as a communication modem for performing communication with a wired/wireless communication network, a memory for storing various programs and data for decoding an image or performing an inter prediction or intra prediction for decoding, various apparatus equipped with microprocessor, etc. for executing programs and calculating and controlling them.

In addition, an image encoded as a bitstream by an encoder may be transmitted to an image decoding apparatus through real-time or non-real-time wired/wireless communication networks such as the Internet, local area wireless communication networks, wireless LAN networks, WiBro networks, mobile communication networks, or through various communication interfaces such as cables, Universal Serial Bus (USB), etc., decoded, reconstructed as an image, and reproduced. Alternatively, the bitstream generated by the encoder may be stored in memory. The memory may include both volatile memory and non-volatile memory. In the present specification, the memory may be represented as a recording medium storing the bitstream.

In general, a video may be composed of a series of pictures, and each picture may be divided into a coding unit such as a block. In addition, a person with ordinary knowledge in the technical field to which this embodiment belongs may understand that the term 'a picture' described below may be used by replacing it with another term having an equivalent meaning such as 'an image' or 'a frame'. In addition, it will be understood by those of ordinary skill in the art to which this embodiment pertains that the term 'a coding unit' may be substituted for and used with other terms having the same meaning, such as 'a unit block' and 'a block'.

Hereinafter, exemplary embodiments of the present disclosure will be described in detail with reference to the accompanying drawings. In describing the present disclosure, redundant description of the same components will be omitted.

FIG. 1 is a block diagram showing an image encoding apparatus according to the present disclosure.

Referring to FIG. 1, the conventional image encoding apparatus 100 includes a picture division unit 110, a prediction unit 120, 125, a transform unit 130, a quantization unit 135, a rearrangement unit 160, and an entropy encoding unit 165, an inverse quantization unit 140, an inverse transform unit 145, a filter unit 150, and a memory 155.

The picture division unit 110 may divide the input picture into at least one processing unit. In this case, the processing unit may be a prediction unit (PU), a transform unit (TU), or a coding unit (CU). Hereinafter, in an embodiment of the present disclosure, a coding unit may be used as a meaning of a unit that performs encoding, or may be used as a meaning of a unit that performs decoding. The block division method will be described in detail with reference to FIG. 3.

The prediction unit may be obtained by dividing in a shape such as at least one square or rectangle of the same size within one coding unit. One of prediction units divided within one coding unit may be obtained by dividing to have a different shape and/or size from the other prediction unit. In generating a prediction unit that performs intra prediction based on a coding unit, when it is not a minimum coding unit, intra prediction may be performed without dividing into a plurality of prediction units N×N.

The prediction units 120 and 125 may include an inter prediction unit 120 that performs inter prediction, and an intra prediction unit 125 that performs intra prediction. Whether to use inter prediction or intra prediction for a prediction unit may be determined, and specific information (e.g., intra prediction mode, motion vector, reference picture, etc.) according to each prediction method may be determined. The residual value (residual block) between the generated prediction block and the original block may be input to the transform unit 130. In addition, prediction mode information, motion vector information, and the like used for prediction may be encoded by the entropy encoding unit 165 together with the residual value and transmitted to the decoder.

The inter prediction unit 120 may predict a prediction unit based on information of at least one of a previous picture or a subsequent picture of the current picture, and in some cases, predict a prediction unit based on information of some regions, which encoding has been completed, in the current picture. The inter prediction unit 120 may include a reference picture interpolation unit, a motion prediction unit, and a motion compensation unit.

The reference picture interpolation unit may receive reference picture information from the memory 155 and generate pixel information of an integer pixel or less in the reference picture. In the case of a luma pixel, a DCT-based 8-tap interpolation filter (DCT-based interpolation filter) having different filter coefficients may be used to generate pixel information of an integer pixel or less in units of a ¼ pixels. In case of a chroma signal, a DCT-based 4-tap interpolation filter (DCT-based interpolation filter) having different filter coefficients may be used to generate pixel information of an integer pixel or less in units of ⅛ pixels.

The motion prediction unit may perform motion prediction based on the reference picture interpolated by the reference picture interpolation unit. As a method for calculating the motion vector, various methods such as Full Search-based Block Matching Algorithm (FBMA), Three Step Search (TSS), and New Three-Step Search Algorithm (NTS) may be used. The motion vector may have a motion vector value in units of ½ or ¼ pixels based on the interpolated pixels. The motion prediction unit may predict a current prediction unit by differently using a motion prediction method. Various methods such as a skip mode, a merge mode, an AMVP (Advanced Motion Vector Prediction) mode, an intra block copy mode, and an affine mode may be used as the motion prediction method.

The intra prediction unit 125 may generate a prediction unit based on reference pixel information around a current block, which is pixel information in a current picture. When the neighboring block of the current prediction unit is a block that performs inter prediction and the reference pixel is a pixel that performs inter prediction, the reference pixel included in the block that performs inter prediction may be used by replacing it with reference pixel information of a block that performs intra prediction around it. That is, when the reference pixel is not available, the unavailable reference pixel information may be used by replacing with at least one reference pixel among the available reference pixels. The intra prediction method will be described in detail with reference to FIGS. 4 to 9.

In addition, a residual block including residual information that is a difference value between the prediction unit that performs prediction based on the prediction units generated by the prediction units 120 and 125 and the original block of the prediction unit may be generated. The generated residual block may be input to the transform unit 130.

The transform unit 130 may transform a residual block including residual information between a prediction unit generated by the prediction units 120 and 125 and the original block by using the transform method such as DCT (Discrete Cosine Transform), DST (Discrete Sine Transform), and KLT. Whether DCT, DST, or KLT is applied to transform the residual block may be determined based on intra prediction mode information of a prediction unit used to generate the residual block.

The quantization unit 135 may quantize values transformed to the frequency domain by the transform unit 130. The quantization coefficient may vary depending on the block or the importance of the image. The value calculated by the quantization unit 135 may be provided to the inverse quantization unit 140 and the rearrangement unit 160.

The rearrangement unit 160 may perform the rearrangement of the coefficient value for the quantized residual value.

The rearrangement unit 160 may change coefficients of 2-dimensional block form into 1-dimensional vector form through a coefficient scanning method. For example, the rearrangement unit 160 may change into a 1-dimensional vector form by scanning from a DC coefficient to a coefficient in a high frequency region according to a Zig-Zag Scan method. Depending on the size of the transform unit and the intra prediction mode, a vertical scan of scanning coefficients of two-dimensional block form in a column direction and a horizontal scan of scanning coefficients of two-dimensional block form in a row direction may be used instead of a zig-zag scan. That is, depending on the size of the transform unit and the intra prediction mode, it may be determined which one of a zigzag scan, a vertical scan, and a horizontal scan is used.

The entropy encoding unit 165 may perform entropy-encoding based on values calculated by the rearrangement unit 160. Various encoding methods, such as exponential Golomb, CAVLC (Context-Adaptive Variable Length Coding), and CABAC (Context-Adaptive Binary Arithmetic Coding), may be used for entropy-encoding. In relation to this, the entropy encoding unit 165 may encode residual value coefficient information of a coding unit from the rearrangement unit 160 and the prediction units 120 and 125. In addition, according to the present disclosure, information indicating that the motion information is derived and used in the decoder side and information on a method used to derive the motion information may be signaled from the encoder.

The inverse quantization unit 140 and the inverse transform unit 145 inverse-quantize the values quantized by the quantization unit 135 and inverse-transform the values transformed by the transform unit 130. The reconstructed block may be generated by combining the residual value generated by the inverse quantization unit 140 and the inverse transform unit 145 with the prediction unit predicted through the motion estimation unit, the motion compensation unit, and the intra prediction unit included in the prediction units 120 and 125.

The filter unit 150 may include at least one of a deblocking filter, an offset modification unit, and an adaptive loop filter (ALF). The deblocking filter may remove block distortion caused by boundary between blocks in the reconstructed picture. The offset modification unit may correct an offset from the original image in units of pixels for the deblocking-filtered image. In order to perform offset modification for a specific picture, after classifying the pixels included in the image into a certain number of regions and determining the region to which the offset is applied, a method of applying the offset to the region offset or a method of applying the offset by considering edge information of each pixel may be used. ALF (Adaptive Loop Filtering) may be performed based on a value obtained by comparing a filtered reconstructed image with an original image. After classifying the pixels included in the image into a predetermined group, one filter to be applied to the group may be determined to perform filtering differently for each group.

The memory 155 may store the reconstructed block or picture output from the filter unit 150, and the stored reconstructed block or picture may be provided to the prediction units 120 and 125 when performing inter prediction.

Figure 2:
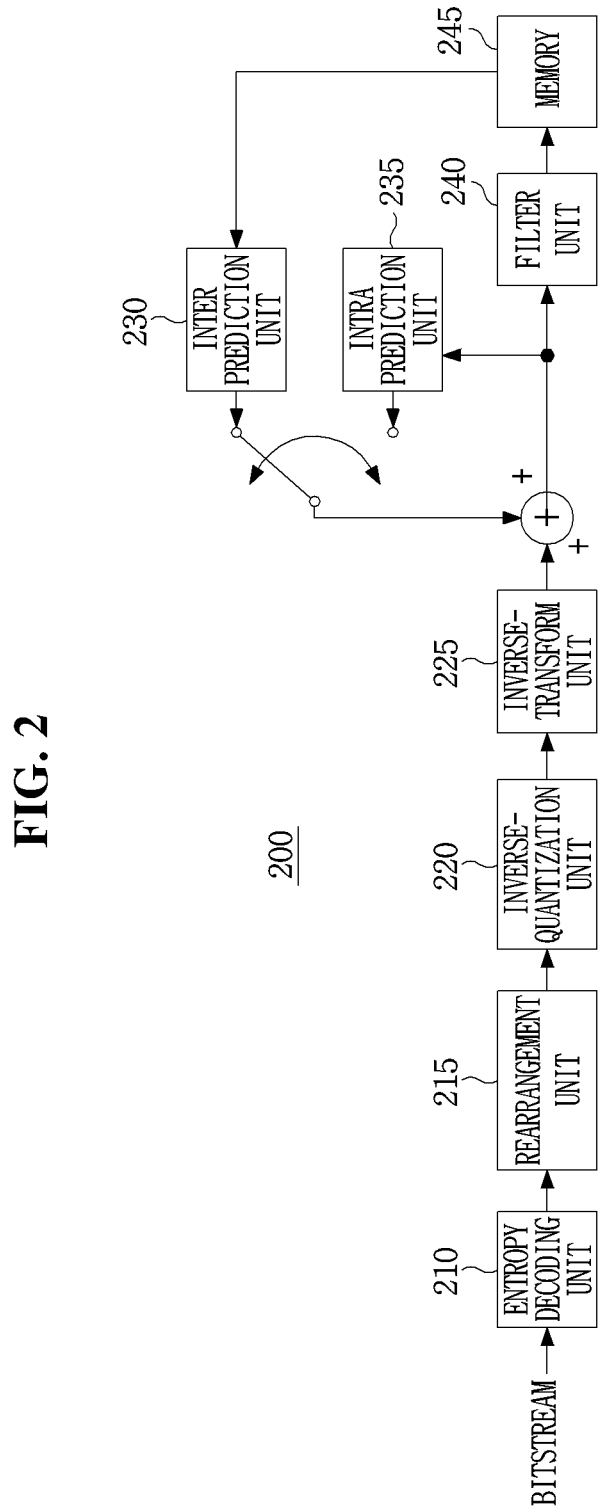
FIG. 2 is a block diagram illustrating an image decoding apparatus according to the present disclosure.

FIG. 2 is a block diagram showing an image decoding apparatus according to the present disclosure.

Referring to FIG. 2, the image decoder 200 may include an entropy decoding unit 210, a rearrangement unit 215, an inverse quantization unit 220, an inverse transform unit 225, a prediction unit 230, 235, and a filter unit 240, a memory 245.

When an image bitstream is input from the image encoder, the input bitstream may be decoded in a procedure opposite to that of the image encoder.

The entropy decoding unit 210 may perform entropy-decoding in a procedure opposite to that performed by entropy-encoding in the entropy encoding unit of the image encoder. For example, various methods corresponding to the method performed in the image encoder such as Exponential Golomb (CAVLC), Context-Adaptive Variable Length Coding (CAVLC), and Context-Adaptive Binary Arithmetic Coding (CABAC) may be applied.

The entropy decoding unit 210 may decode information related to intra prediction and inter prediction performed by the encoder.

The rearrangement unit 215 may perform rearrangement of the bitstream entropy-decoded by the entropy decoding unit 210 based on a rearrangement method of the encoding unit. The coefficients of a 1-dimensional vector form may be rearranged into coefficients of a 2-dimensional block form again.

The inverse quantization unit 220 may perform inverse quantization based on the quantization parameter provided by the encoder and the coefficients of the rearranged block.

The inverse transform unit 225 may perform inverse transform, that is, inverse DCT, inverse DST, and inverse KLT, corresponding to transforms performed by the transform unit, that is, DCT, DST, and KLT for the quantization results performed by the image encoder. The inverse transform may be performed based on the transmission unit determined by the image encoder. In the inverse transform unit 225 of the image decoder, a transform type (for example, DCT, DST, KLT) may be selectively performed according to a plurality of information such as a prediction method, a size of a current block, and a prediction direction.

The prediction units 230 and 235 may generate a prediction block based on prediction block generation related information provided by the entropy decoding unit 210 and previously decoded block or picture information provided by the memory 245.

As described above, when a size of the prediction unit and a size of the transform unit are the same in performing intra prediction in the same manner as in the image encoder, the intra prediction of the prediction unit may be performed based on pixels located on the left, the top-left and the top of the prediction unit. However, when the size of the prediction unit and the size of the transform unit are different in performing intra prediction, the intra prediction may be performed using a reference pixel based on the transform unit. In addition, the intra prediction using N×N division may be used only for the minimum coding unit.

The prediction unit 230 and 235 may include at least one of a prediction unit determination unit, an inter prediction unit, and an intra prediction unit. The prediction unit determination unit may receive various information from the entropy decoding unit 210 such as prediction unit information, prediction mode information of an intra prediction method, and motion prediction related information of an inter prediction method, classify the prediction unit from the current coding unit, and determine whether the prediction unit performs inter prediction or intra prediction. On the other hand, if the motion prediction related information for the inter prediction is not transmitted, and instead, information indicating that the motion information is derived and used in the decoder side and information about a method used to derive the motion information is transmitted from the encoder 100, the prediction unit determination unit determines the prediction performance of the inter prediction unit 230 based on the information transmitted from the encoder 100.

The inter prediction unit 230 may perform inter prediction for a current prediction unit based on information included in at least one of a previous picture or a subsequent picture of the current picture including the current prediction unit, by using information required for inter prediction of the current prediction unit provided by the image encoder. In order to perform inter prediction, it may be determined whether a motion prediction method of a prediction unit included in a coding unit is a skip mode, a merge mode, an AMVP mode, an intra block copy mode, or an affine mode.

The intra prediction unit 235 may generate a prediction block based on pixel information in the current picture. When the prediction unit is a prediction unit that has performed intra prediction, intra prediction may be performed based on intra prediction mode information of a prediction unit provided by an image encoder.

The intra prediction unit 235 may include an adaptive intra smoothing (AIS) filter, a reference pixel interpolation unit, and a DC filter. The AIS filter is a part that performs filtering on the reference pixel of the current block and may be applied by determining whether to apply the filter according to the prediction mode of the current prediction unit. AIS filtering may be performed on a reference pixel of a current block by using prediction mode and AIS filter information of a prediction unit provided by an image encoder. When the prediction mode of the current block is a mode that does not perform AIS filtering, the AIS filter may not be applied.

When the prediction mode of the prediction unit is the prediction unit that performs intra prediction based on the pixel value obtained by interpolating the reference pixel, the reference pixel interpolation unit may interpolate the reference pixel to generate a reference pixel of an integer pixel or less. When the prediction mode of the current prediction unit is a prediction mode in which a prediction block is generated without interpolating a reference pixel, the reference pixel may not be interpolated. The DC filter may generate a prediction block through filtering when the prediction mode of the current block is the DC mode. The intra prediction method will be described in detail with reference to FIGS. 4 to 9.

The reconstructed block or picture may be provided to the filter unit 240. The filter unit 240 may include a deblocking filter, an offset modification unit, and an ALF.

Information about whether a deblocking filter is applied to a corresponding block or picture and information about whether a strong filter is applied or a weak filter is applied in applying the deblocking filter may be provided from a video encoder. In the deblocking filter of the video decoder, information related to the deblocking filter provided by the video encoder may be provided, and the video decoder may perform deblocking filtering on the corresponding block.

The offset modification unit may perform offset modification on the reconstructed image based on a type of offset modification and offset value information applied to the image during encoding. ALF may be applied to a coding unit based on information on whether to apply ALF, ALF coefficient information, and the like, provided by an encoder. This ALF information may be provided from a specific parameter set.

The memory 245 may store the reconstructed picture or block so that it can be used as a reference picture or a reference block, and may also provide the reconstructed picture to an output unit.

Figure 3:
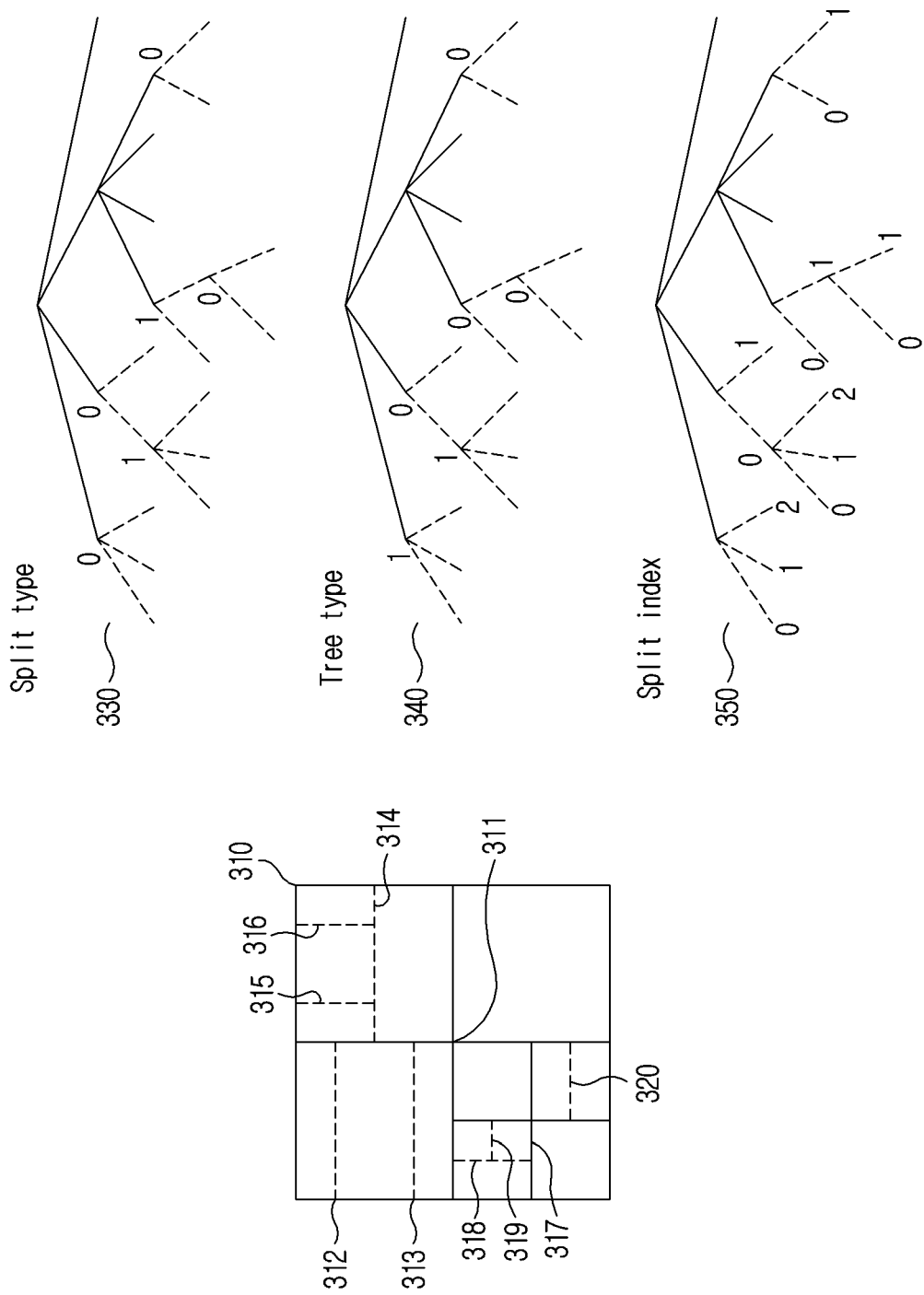
FIG. 3 is a diagram illustrating a concept of a multi-tree type (MTT) block structure, a division type, and a division block index generated according to binary and ternary divisions according to an embodiment of the present invention.

FIG. 3 is a diagram illustrating a concept of a multi-tree type (MTT) block structure, a division type, and a division block index generated according to binary and ternary divisions according to an embodiment of the present invention.

When one block 310 divided using MTT block division according to an embodiment exists, the corresponding block 310 may be divided into four square blocks using quadtree block division. In addition, in the MTT block division, binary block division or ternary block division may be started from a leaf node of a quadtree generated through quadtree block division.

In FIG. 3, the first quadtree division block of the highest block 310 shows an embodiment in which ternary block divisions 312 and 313 in the horizontal direction are performed from a leaf node of the quadtree, and the widths of the three blocks divided by performing the ternary block division 312 and 313 in the horizontal direction have the same size N. The heights of the three blocks divided by performing the ternary block division 312 and 313 have N/4, N/2, and N/4.

The second quadtree division block of the highest block 310 shows an embodiment in which the binary block division 314 in the horizontal direction is performed from the leaf node of the quadtree, and the the ternary block division 315 and 316 in the vertical direction is performed once again for the first binary division block among the two binary division blocks divided by performing the binary block division 314 in the horizontal direction. The heights of the three blocks divided by performing the ternary block division 315 and 316 in the vertical direction have the same size M, and the widths of the divided three blocks have M/4, M/2, and M/4.

Reference numeral 330 of FIG. 3 shows a division type (split type) according to the direction of binary and ternary block divisions. The division type may be used interchangeably with terms such as binary and ternary division direction, binary and ternary division shape, binary and ternary division type. Dividing one block in one of a horizontal direction and a vertical direction may be expressed using 0 and 1. In one embodiment, block division in the vertical direction is indicated by 1 and block division in the horizontal direction is indicated by 0.

Reference numeral 350 of FIG. 3 shows a division index (split index) for binary and ternary division blocks. The binary and ternary division indexes may be expressed using 0, 1, and 2 according to a coding order for two division blocks generated by binary division of one higher block. Reference numeral 350 of FIG. 3 illustrates, based on the binary and ternary division indexes, an embodiment in which among two division blocks that are binary-divided, the first binary division block is represented by an index of 0, and the second binary division block is represented by an index of 1 and an embodiment in which among three division blocks that are ternary-divided, the first ternary division block is represented by an index of 0, the second ternary division block is an index of 1, and the third ternary division block is represented by an index of 2.

Figure 4:
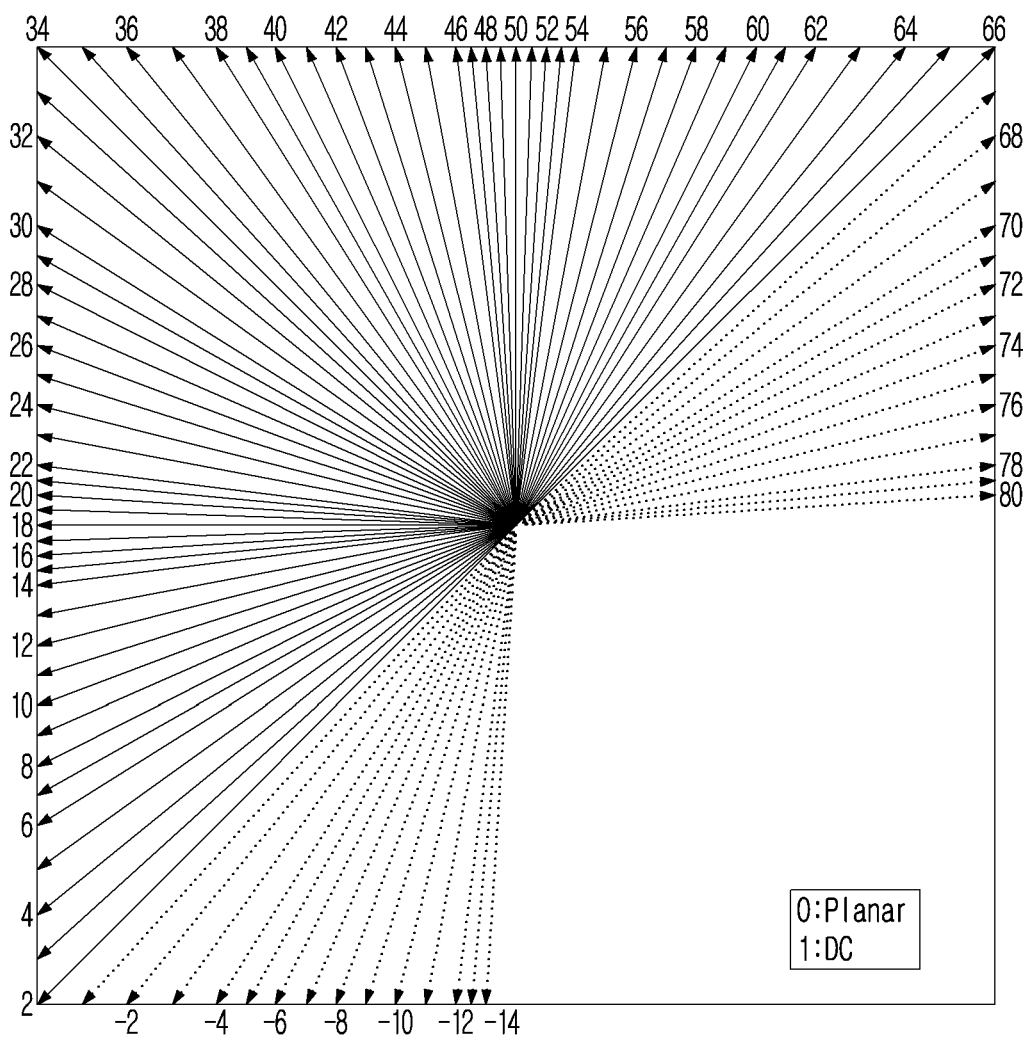
FIG. 4 illustrates an intra prediction mode predefined in an encoding/decoding apparatus according to an embodiment to which the present invention is applied.

FIG. 4 illustrates an intra prediction mode predefined in an encoding/decoding apparatus according to an embodiment to which the present invention is applied.

Referring to FIG. 4, the pre-defined intra prediction modes may include two non-directional modes and 65 directional modes. The non-directional modes may include a planar mode and a DC mode. The directional modes may be defined as mode 2 to mode 66 having a predetermined angle. In particular, mode 2, mode 34 and mode 66 may be defined as diagonal modes. The intra prediction modes between mode 2 and mode 34 may be defined as modes with horizontal directionality, and the intra prediction modes between mode 34 and mode 66 may be defined as modes with vertical directionality. Further, depending on the shape of the block, a mode less than mode 2 or a mode greater than mode 66 may be used, which will be described in detail with reference to FIG. 5.

In addition, the intra prediction modes of FIG. 4 are only an example, and fewer than 67 intra prediction modes may be defined, and conversely, more than 67 intra prediction modes may be defined. Alternatively, the number of modes having a horizontal directionality and the number of modes having a vertical directionality may be different from each other according to a block property. In the present invention, for convenience of explanation, 67 intra prediction modes are defined, and it is assumed that the number of modes having a horizontal directionality and the number of modes having a vertical directionality are the same.

Figure 5:
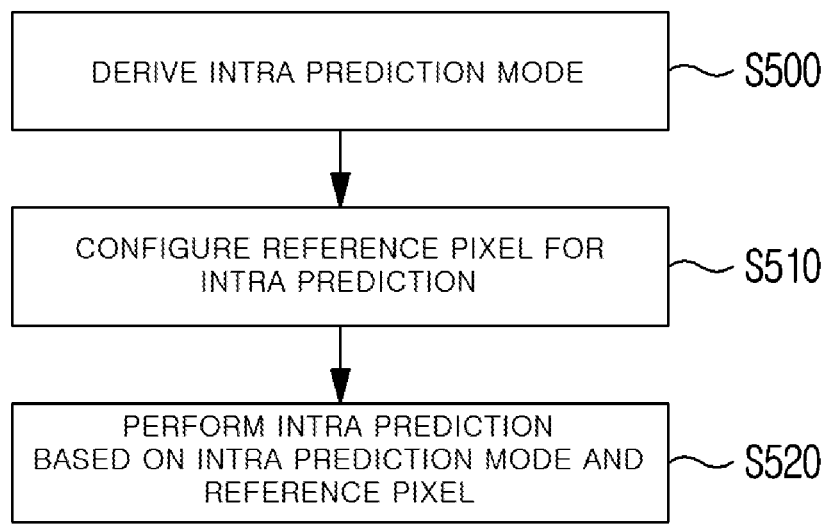
FIG. 5 illustrates an intra prediction method according to an embodiment to which the present invention is applied.

FIG. 5 illustrates an intra prediction method according to an embodiment to which the present invention is applied.

Referring to FIG. 5, an intra prediction mode of a current block may be derived (S500).

The current block may use a default mode pre-defined in the image encoding/decoding apparatus. The default mode may be a directional mode or a non-directional mode. For example, the directional mode may include at least one of a vertical mode, a horizontal mode, and a diagonal mode. The non-directional mode may include at least one of a planar mode and a DC mode. When it is determined that the current block uses the default mode, the intra prediction mode of the current block may be set as the default mode. The number of pre-defined default modes may be 1, 2, 3 or more. When a plurality of default modes are defined, an index specifying any one of the plurality of default modes may be signaled. The default mode corresponding to the signaled index may be set as the intra prediction mode of the current block.

Alternatively, the intra prediction mode of the current block may be derived based on a candidate list including a plurality of MPM candidates. First, a predetermined MPM candidate may be selected from the pre-defined intra prediction modes described above. However, when the current block does not use the default mode, the MPM candidate may be selected from the remaining modes other than the default mode among the pre-defined intra prediction modes. The number of MPM candidates may be 3, 4, 5, 6 or more. The MPM candidate may be derived based on an intra prediction mode of a neighboring block adjacent to the current block. The neighboring block may be a block adjacent to at least one of the left, top, top-left, bottom-left, or top-right of the current block.

Specifically, the MPM candidate may be determined in consideration of whether the intra prediction mode of the left block (candIntraPredModeA) and the intra prediction mode of the top block (candIntraPredModeB) are the same and whether candIntraPredModeA and candIntraPredModeB are non-directional modes.

For example, when candIntraPredModeA and candIntraPredModeB are the same and candIntraPredModeA is not a non-directional mode, the MPM candidate of the current block may include at least one of candIntraPredModeA, (candIntraPredModeA−n), (candIntraPredModeA+n), or a non-directional mode. Here, n may be an integer of 1, 2, or more. The non-directional mode may include at least one of a planar mode and a DC mode. As an example, the MPM candidates of the current block may be determined as shown in Table 1 below. The index of Table 1 specifies the position or priority of the MPM candidate, but is not limited thereto. For example, index 1 may be allocated to the DC mode or index 4 may be allocated to the DC mode.

TABLE 1

| index | MPM candidate |
|---|---|
| 0 | candIntraPredModeA |
| 1 | 2 + ((candIntraPredModeA + 61) % 64) |
| 2 | 2 + ((candIntraPredModeA − 1) % 64) |
| 3 | INTRA_DC |
| 4 | 2 + ((candIntraPredModeA + 60) % 64) |

Alternatively, when candIntraPredModeA and candIntraPredModeB are not the same and both candIntraPredModeA and candIntraPredModeB are not non-directional modes, the MPM candidate of the current block may include at least one of candIntraPredModeA, candIntraPredModeB, (maxAB−n), (maxAB+n), (minAB−n), (minAB−n), (minAB+n), or a non-directional mode. Here, maxAB and minAB mean a maximum value and a minimum value of candIntraPredModeA and candIntraPredModeB, respectively, and n may be an integer of 1, 2, or more. The non-directional mode may include at least one of a planar mode and a DC mode. As an example, the MPM candidates of the current block may be determined as shown in Table 2 below. The index of Table 2 specifies the position or priority of the MPM candidate, but is not limited thereto. For example, the largest index may be allocated to the DC mode.

Meanwhile, the MPM candidate may be determined differently based on the difference value between candIntraPredModeA and candIntraPredModeB. For example, when a difference value between candIntraPredModeA and candIntraPredModeB belongs to a predetermined threshold range, MPM candidate 1 of Table 2 may be applied, otherwise, MPM candidate 2 may be applied. Here, the threshold range may mean a range greater than or equal to 2 and less than or equal to 62. Alternatively, when the difference value between candIntraPredModeA and candIntraPredModeB does not belong to the threshold range, one of the MPM candidates may be derived based on maxAB and the other may be derived based on minAB. For example, one of the MPM candidates may be derived by adding 1 to maxAB, and the other may be derived by subtracting 1 from minAB.

TABLE 2

| Index | MPM candidate 1 | MPM candidate 2 |
|---|---|---|
| 0 | candIntraPredModeA | candIntraPredModeA |
| 1 | candIntraPredModeB | candIntraPredModeB |
| 2 | INTRA_DC | INTRA_DC |
| 3 | 2 + ((maxAB + 61) % 64) | 2 + ((maxAB + 60) % 64) |
| 4 | 2 + ((maxAB − 1) % 64) | 2 + ((maxAB) % 64) |

Alternatively, when candIntraPredModeA and candIntraPredModeB are not the same and only one of candIntraPredModeA and candIntraPredModeB is a non-directional mode, the MPM candidate of the current block may include at least one of maxAB, (maxAB−n), (maxAB+n), or a non-directional mode. Here, maxAB means a maximum value among candIntraPredModeA and candIntraPredModeB, and n may be an integer of 1, 2, or more. The non-directional mode may include at least one of a planar mode and a DC mode. As an example, the MPM candidate of the current block may be determined as shown in Table 3 below. The index of Table 3 specifies the position or priority of the MPM candidate, but is not limited thereto. For example, index 0 may be allocated to the DC mode and index 1 may be allocated to maxAB.

TABLE 3

| index | MPM candidate |
|---|---|
| 0 | maxAB |
| 1 | INTRA_DC |
| 2 | 2 + ((maxAB + 61) % 64) |
| 3 | 2 + ((maxAB − 1) % 64) |
| 4 | 2 + ((maxAB + 60) % 64) |

Alternatively, when candIntraPredModeA and candIntraPredModeB are not the same and both candIntraPredModeA and candIntraPredModeB are non-directionals, the MPM candidate of the current block may include at least one of a non-directional mode, a vertical mode, a horizontal mode, (vertical mode−m), (vertical mode+m), (horizontal mode−m), or (horizontal mode+m). Here, m may be an integer of 1, 2, 3, 4 or more. The non-directional mode may include at least one of a planar mode and a DC mode. As an example, the MPM candidate of the current block may be determined as shown in Table 4 below. The index of Table 4 specifies the position or priority of the MPM candidate, but is not limited thereto. For example, index 1 or the largest index may be allocated to the horizontal mode. Further, the MPM candidate may include at least one of a diagonal mode (e.g., mode 2, mode 34, mode 66), (diagonal mode−m), or (diagonal mode+m).

TABLE 4

| Index | MPM candidate |
|---|---|
| 0 | INTRA_DC |
| 1 | Vertical mode |
| 2 | Horizontal mode |
| 3 | (Vertical mode − 4) |
| 4 | (Vertical mode + 4) |

Alternatively, the MPM candidate may be derived based on table information pre-defined in the encoding/decoding apparatus. The table information may define MPM candidates for each size of the current block and/or the neighboring block. Here, the number of MPM candidates may be 3, 4, 5 or more. For example, the table information of the present invention may be defined as follows.

TABLE 5

| | candidate mode x | | |
|---|---|---|---|
| sizeId | 0 | 1 | 2 |
| 0 | 17 | 34 | 5 |
| 1 | 0 | 7 | 16 |
| 2 | 1 | 4 | 6 |

In Table 5, sizeId is an identifier representing the size of the current block and/or the neighboring block, and candidate mode x represents an MPM candidates defined for each sizeId. When the size is 4×4, sizeId may be determined as 0. When the size is greater than 4×4 and less than or equal to 8×8, the sizeId may be determined as 1. Otherwise, the sizeId may be determined as 2.

Specifically, when the intra prediction mode of the left/top neighboring block is not available, the MPM candidate may be derived as candidate mode x (x=0, 1, 2) in consideration of sizeId as defined in Table 5.

Alternatively, when the intra prediction modes of the left/top neighboring blocks are the same (or any one of the intra prediction modes of the left/top neighboring blocks is not available), the MPM candidates may include any one of the intra prediction modes of the left/top neighboring blocks and k of the above-described candidate mode x. Here, k may be an integer of 1, 2, 3, 4 or more. Among the candidate mode x, k may be added to the candidate list in consideration of a predetermined priority. The priority is determined based on the x value shown in Table 5. For example, the smaller the x value, the higher the priority. However, k of candidate mode x may be added only when they are not the same as the pre-added MPM candidates. For example, when k is 2, modes corresponding to candidate modes 0 and 1 having high priority may be added as MPM candidates. However, when candidate mode 0 is the same as the pre-added MPM candidate, modes corresponding to candidate modes 1 and 2 may be added as MPM candidates. Alternatively, when candidate mode 1 is the same as the pre-added MPM candidate, modes corresponding to candidate modes 0 and 2 may be added as MPM candidates.

Alternatively, when the intra prediction modes of the left/top neighboring blocks are not the same, the MPM candidate may include at least one of the intra prediction mode of the left neighboring block, the intra prediction mode of the top neighboring block, or at least one of candidate mode x of Table 5 above. In this case, k modes having a priority among candidate mode x may be added to the candidate list. Likewise, among candidate mode x, the same mode as the MPM candidate pre-added to the candidate list may be restricted so that it is not added to the candidate list.

Meanwhile, in the above-described embodiment, an intra prediction mode of a neighboring block is added to the candidate list, but is not limited thereto. For example, as shown in Table 6, a mode mapped to an intra prediction mode of a neighboring block may be added to the candidate list. In this case, the intra prediction mode of the neighboring block may be restricted so that it is not added to the candidate list. Table 6 is a table pre-defined in the encoding/decoding apparatus, and a mode mapped to an intra prediction mode (IntraPredModeY[xNbX][yNbX]) of a neighboring block according to the size (sizeId) of the current block and/or the neighboring block may be defined.

TABLE 6

| IntraPredModeY[xNbX][yNbX] | SizeId | | |
|---|---|---|---|
| | 0 | 1 | 2 |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |

TABLE 6-continued

| IntraPredModeY[xNbX][yNbX] | SizeId | | |
|---|---|---|---|
| | 0 | 1 | 2 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

Among the plurality of MPM candidates described above, an MPM candidate specified by an MPM index may be set as an intra prediction mode of the current block. The MPM index may be encoded and signaled by an image encoding apparatus.

As described above, the intra prediction mode may be derived by selectively using either the default mode or the MPM candidate. The selection may be performed based on a first flag signaled by the encoding apparatus. In this case, the first flag may indicate whether the intra prediction mode of the current block is set as the default mode. If the flag is a first value, the intra prediction mode of the current block is set as the default mode, otherwise, information such as a second flag indicating whether the intra prediction mode of the current block is derived from an MPM candidate, an MPM index, etc. may be signaled.

Alternatively, the second flag may be signaled before the first flag. For example, when the intra prediction mode of the current block is derived from the MPM candidate according to the second flag, the first flag may be signaled. If the signaled first flag is the first value, the intra prediction mode of the current block is set as the default mode, otherwise, the MPM index may be signaled. Alternatively, if the intra prediction mode of the current block is derived from the MPM candidate according to the second flag, the MPM index may be signaled, otherwise, the first flag may be signaled.

The intra prediction mode (IntraPredMode) decoded through the above-described process may be changed based on a predetermined offset.

The application of the offset may be selectively performed based on at least one of block properties, that is, a size, a shape, division information, a division depth, a value of an intra prediction mode, or a component type. Here, the block may mean the current block and/or a block adjacent to the current block.

The division information may include at least one of first information indicating whether the current block is divided into a plurality of sub-blocks, second information indicating a division direction (e.g., horizontal or vertical), or third information regarding the number of divided sub-blocks. The division information may be encoded and signaled by an encoding apparatus. Alternatively, some of the division information may be variably determined by the decoding apparatus based on the above-described properties of the block, or may be set to a fixed value pre-defined in the encoding/decoding apparatus.

For example, if the first information is a first value, the current block is divided into a plurality of sub-blocks, otherwise, the current block may not be divided into a plurality of sub-blocks (NO_SPLIT). When the current block is divided into a plurality of sub-blocks, the current block may be horizontally divided (HOR_SPLIT) or vertically divided (VER_SPLIT) based on the second information. In this case, the current block may be divided into k sub-blocks. Here, k may be an integer of 2, 3, 4 or more. Alternatively, k may be limited to a power of 2, such as 1, 2, 4, etc. Alternatively, in the case of a block in which at least one of the width or height of the current block is 4 (e.g., 4×8, 8×4), the k is set to 2, otherwise, the k may be set to 4, 8, or 16. When the current block is non-divided (NO_SPLIT), k may be set to 1.

The current block may be divided into sub-blocks having the same width and height, or may be divided into sub-blocks having different widths and heights. The current block may be divided into N×M block units (e.g., 2×2, 2×4, 4×4, 8×4, 8×8, etc.) pre-committed to the encoding/decoding apparatus, regardless of the properties of the above-described block.

The offset may be applied only when the size of the current block is less than or equal to a predetermined threshold value T1. Here, the threshold value T1 may mean a maximum block size to which the offset is applied. Alternatively, it may be applied only when the size of the current block is greater than or equal to a predetermined threshold value T2. In this case, the threshold value T2 may mean the minimum block size to which the offset is applied. The threshold value may be signaled through a bitstream. Alternatively, it may be variably determined by the decoding apparatus based on at least one of the above-described block properties, or may be a fixed value pre-committed to the encoding/decoding apparatus.

Alternatively, the offset may be applied only when the shape of the current block is non-square. For example, when the following conditions are satisfied, a predetermined offset (e.g., 65) may be added to the IntraPredMode of the current block.

nW is greater than nH
IntraPredMode is greater than or equal to 2
IntraPredMode is less than (whRatio>1) ? (8+2*whRatio): 8

Here, nW and nH denote the width and the height of the current block, respectively, and whRatio may be set to Abs(Log 2(nW/nH)).

Alternatively, when the following conditions are satisfied, a predetermined offset (e.g., 67) may be subtracted from the IntraPredMode of the current block.

nH is greater than nW
IntraPredMode is greater than or equal to 66
IntraPredMode is less than (whRatio>1) ? (60−2*whRatio): 60

As described above, the final intra prediction mode may be determined by adding/subtracting an offset to the intra prediction mode (IntraPredMode) of the current block in consideration of the properties of the current block. However, the present invention is not limited thereto, and the application of the offset may be performed in the same/similar manner in consideration of the properties of the subblock belonging to the current block, and a detailed description thereof will be omitted.

Referring to FIG. 5, a reference pixel for intra prediction of a current block may be configured (S510).

The reference pixel may belong to at least one of a plurality of pixel lines adjacent to the current block. Here, the plurality of pixel lines may include at least one of a first pixel line adjacent to the current block, a second pixel line adjacent to the first pixel line, a third pixel line adjacent to the second pixel line, or a fourth pixel line adjacent to the third pixel line.

For example, the plurality of pixel lines may include all of the first to fourth pixel lines, or may include only the remaining pixel lines except for the third pixel line. Alternatively, the plurality of pixel lines may include only the first pixel line and the fourth pixel line.

The current block may perform intra prediction by selecting any one of the plurality of pixel lines. The selection may be performed based on an index (refIdx) signaled by the encoding apparatus. Alternatively, one of the plurality of pixel lines may be selectively used based on the size, shape, division type, whether the intra prediction mode is a non-directional mode, angle of the intra prediction mode, component type, etc. relating to the current block.

For example, when the intra prediction mode is a planar mode or a DC mode, only the first pixel line may be used. Alternatively, when the size (width or height) of the current block is less than or equal to a predetermined threshold value, only the first pixel line may be used. Alternatively, when the intra prediction mode is larger than a predetermined threshold angle (or smaller than a predetermined threshold angle), only the first pixel line may be used. The threshold angle may be an angle of an intra prediction mode corresponding to mode 2 or mode 66 among the above-described pre-defined intra prediction modes.

Meanwhile, in the block structure of FIG. 3, a reference pixel for intra prediction may be configured according to the width and height of the current block. For example, the reference pixel may include at least one of a top-left pixel (PTL), a top pixel (PT), a top-right pixel (PTR), a left pixel (PL), or a bottom-left pixel (PLB) of the current block. Here, the number of the top pixel PT and the top-right pixel PTR may be equal to the sum of the width (nCbW) and the height (nCbH) of the current block, or may be equal to the width of the current block (nCbW)*2. The number of the left pixel PL and the bottom-left pixel PLB may be equal to the sum of the width (nCbW) and height (nCbH) of the current block, or may be equal to the height of the current block (nCbH)*2.

Filtering may be performed on the configured reference pixel. The filtering may be selectively performed based on a predetermined flag. Here, the flag may indicate whether filtering is performed on the reference pixel for intra prediction. The flag may be encoded and signaled by an encoding apparatus. Alternatively, the flag may be derived from the decoding apparatus based on the encoding parameter of the current block. The encoding parameter may include at least one of a position/region of a reference pixel, a block size, a component type, whether intra prediction in sub-block units is applied, or an intra prediction mode.

For example, if the reference pixel of the current block is a first pixel line adjacent to the current block, filtering may be performed on the reference pixel, otherwise, filtering may not be performed on the reference pixel. Alternatively, when the number of pixels belonging to the current block is greater than a predetermined threshold number, filtering may be performed on the reference pixel, otherwise, filtering may not be performed on the reference pixel. The threshold number is a value pre-committed to the encoding/decoding apparatus and may be an integer of 16, 32, 64 or more.

Alternatively, if the current block is a luminance component, filtering may be performed on the reference pixel, otherwise, filtering may not be performed on the reference pixel. Alternatively, if the current block does not perform the above-described intra prediction in units of sub-blocks (i.e., the current block is not divided into a plurality of sub-blocks), filtering may be performed on the reference pixel, otherwise, filtering may not be performed on the reference pixel. Alternatively, if the intra prediction mode of the current block is a non-directional mode or a predetermined directional mode, filtering may be performed on the reference pixel, otherwise, filtering may not be performed on the reference pixel. Here, the non-directional mode may be a planar mode or a DC mode. However, in the DC mode among the non-directional modes, it may be restricted so that filtering of the reference pixel is not performed. The directional mode may mean an intra prediction mode referring to an integer pixel. For example, the directional mode may include at least one of the intra prediction modes corresponding to modes −14, −12, −10, −6, 2, 18, 34, 50, 66, 72, 78, and 80 shown in FIG. 13. However, the directional mode may be limited so that the horizontal mode and the vertical mode respectively corresponding to modes 18 and 50 are not included.

When filtering is performed on a reference pixel according to the flag, filtering may be performed based on a filter predefined in the encoding/decoding apparatus. The number of taps of the filter may be 1, 2, 3, 4, 5 or more. The number of filter taps may be variably determined according to the position of the reference pixel. For example, a 1-tap filter may be applied to a reference pixel corresponding to at least one of a bottommost end, a topmost end, a leftmost side, or a rightmost side of a pixel line, and a 3-tap filter may be applied to the remaining reference pixels.

Also, the filter strength may be variably determined according to the position of the reference pixel. For example, a filter strength of s1 may be applied to a reference pixel corresponding to at least one of the bottommost, topmost, leftmost, or rightmost of a pixel line, and a filter strength of s2 may be applied to the remaining reference pixels (s1<s2). The filter strength may be signaled by the encoding apparatus or may be determined based on the above-described encoding parameter.

When the n-tap filter is applied to the reference pixel, the filter may be applied to the current reference pixel and (n−1) neighboring reference pixels. The neighboring reference pixel may mean a pixel located in at least one of a top, bottom, left, or right side of a current reference pixel. The neighboring reference pixel may belong to the same pixel line as the current reference pixel, and some of the neighboring reference pixels may belong to a pixel line different from the current reference pixel. For example, when the current reference pixel is located on the left side of the current block, the neighboring reference pixel may be a pixel adjacent to at least one of the top or bottom of the current reference pixel. Alternatively, when the current reference pixel is located above the current block, the neighboring reference pixel may be a pixel adjacent to at least one of the left or right of the current reference pixel. Alternatively, when the current reference pixel is located at the top-left of the current block, the neighboring reference pixel may be a pixel adjacent to at least one of the bottom or the right of the current reference pixel. The ratio between the coefficients of the filter may be [1:2:1], [1:3:1], or [1:4:1].

Referring to FIG. 5, intra prediction of the current block may be performed based on the intra prediction mode and the reference pixel (S520).

Specifically, a pixel of the current block may be predicted based on a reference pixel according to the intra prediction mode among the configured reference pixels.

If the intra prediction mode of the current block is the DC mode, the pixel of the current block may be predicted as the average value of the reference pixels. Here, the reference pixels may include at least one of reference pixels adjacent to the left side of the current block or reference pixels adjacent to the top side of the current block. The range of the reference pixels for the DC mode may be determined in consideration of the size/shape of the current block.

For example, when the width and the height of the current block are the same, the pixel of the current block may be predicted by the average value of reference pixels adjacent to the left side of the current block (hereinafter, referred to as left reference pixels) and reference pixels adjacent to the top (hereinafter, referred to as top reference pixels). However, when the width of the current block is greater than the height, the pixel of the current block may be predicted as an average value of the top reference pixels of the current block. When the height of the current block is greater than the width, the pixel of the current block may be predicted as an average value of the left reference pixels of the current block.

The left/top reference pixels may belong to at least one of a first pixel line to a fourth pixel line. In this case, the left reference pixels may be composed of only pixels having the same y-coordinate as the pixel of the current block within the pixel line. The top reference pixels may be composed of only pixels having the same x-coordinate as the pixel of the current block within the pixel line. For example, it is assumed that the position of the top-left sample of the current block is (xCb,yCb), and the width and the height of the current block are nCbW and nCbH, respectively. When the left/top reference pixels belong to the second pixel line, the left reference pixels are set to (xL,yL), where xL is (xCb−2) and yL is yCb, (yCb+1), . . . , (yCb+nCbH−1). The top reference pixels are set to (xT,yT), where xT is xCb, (xCb+1), . . . , (xCb+nCbW−1), and yT is (yCb−2). Likewise, when the left/top reference pixels belong to the fourth pixel line, the left reference pixels are set to (xL,yL), where xL is (xCb−4) and yL is yCb, (yCb+1), . . . , (yCb+nCbH−1). The top reference pixels are set to (xT,yT), where xT is xCb, (xCb+1), . . . , (xCb+nCbW−1), and yT is (yCb−4). In this way, pixels having x-coordinates and y-coordinates smaller than the position (xCb,yCb) of the top-left pixel of the current block in the pixel line for intra prediction of the current block may be restricted so as not to be referenced.

Alternatively, when the width of the current block is greater than the height, the pixel of the current block may be predicted as an average value of at least one of reference pixels adjacent to the top of the current block or reference pixels adjacent to the top-right. In this case, all or some of the top neighboring reference pixels may be used, and all or some of the top-right neighboring reference pixels may be used. When the height of the current block is greater than the width, the pixel of the current block may be predicted as an average value of at least one of reference pixels adjacent to the left of the current block or reference pixels adjacent to the bottom-left of the current block. Likewise, all or some of the left reference pixels may be used, and all or some of the bottom-left reference pixels may be used. The range of the reference pixels for the DC mode will be described in detail with reference to FIGS. 6 to 8.

Intra prediction may be performed in units of the current block (e.g., coding block, prediction block, transform block, etc.) or may be performed in units of predetermined subblocks. To this end, first information indicating whether the current block is divided into sub-blocks and intra prediction is performed may be used. The first information may be encoded and signaled by an encoding apparatus. If the first information is a first value, the current block is divided into a plurality of sub-blocks, otherwise, the current block is not divided into a plurality of sub-blocks. Herein, the division may be an additional division performed after the tree structure-based division described in FIG. 3. That is, the current block may mean a coding block that is no longer divided into smaller coding blocks based on a tree structure.

Sub-blocks belonging to the current block share one intra prediction mode, but different reference pixels may be configured for each sub-block. Alternatively, the sub-blocks may use the same intra prediction mode and reference pixel. Alternatively, the subblocks may use the same reference pixel, but different intra prediction modes may be used for each subblock.

The division may be performed in a vertical or horizontal direction. The division direction may be determined based on second information signaled by the encoding apparatus. For example, if the second information is a first value, it may be divided in a horizontal direction, otherwise, it may be divided in a vertical direction. Alternatively, the division direction may be determined based on the size of the current block. For example, when the height of the current block is greater than a predetermined threshold size, it is divided in a horizontal direction, and when the width of the current block is greater than a predetermined threshold size, it may be divided in a vertical direction. Here, the threshold size may be a fixed value pre-defined in the encoding/decoding apparatus, or may be determined based on information on the block size (e.g., the size of the maximum transform block, the size of the maximum coding block, etc.). The information on the block size may be signaled at at least one level among a sequence, a picture, a slice, a tile, a brick, or a CTU row.

The current block may be divided into k sub-blocks, and k may be an integer of 2, 3, 4 or more. Alternatively, k may be limited to a power of 2, such as 1, 2, 4, etc. The number of sub-blocks may be variably determined based on the size, shape, division depth, and intra prediction mode of the current block. For example, when the current block is 4×8 or 8×4, the current block may be divided into two sub-blocks. Alternatively, when the current block is greater than or equal to 8×8, the current block may be divided into four sub-blocks.

A prediction block of the current block may be generated through the above-described intra prediction. The prediction block may be corrected based on a predetermined neighboring pixel and a weight. Here, the neighboring pixel and the weight may be determined depending on the position of the pixel (hereinafter referred to as the current pixel) in the current block to be corrected. Also, the neighboring pixel and the weight may be determined dependently on the intra prediction mode of the current block.

For example, when the intra prediction mode of the current block is a non-directional mode, the neighboring pixels (refL, refT) of the current pixel may belong to a first pixel line adjacent to the current block, and may be located on the same horizontal/vertical line as the current pixel. The weight may include at least one of a first weight wL in the x-axis direction, a second weight wT in the y-axis direction, or a third weight wTL in a diagonal direction. The first weight may mean a weight applied to the left neighboring pixel, the second weight may mean a weight applied to the top neighboring pixel, and the third weight may mean a weight applied to the top-left neighboring pixel. Here, the first and second weights may be determined based on position information of the current pixel and a predetermined scaling factor nScale. The scaling factor may be determined based on the width (nCbW) and the height (nCbH) of the current block. For example, the first weight wL[x] of the current pixel (predSample[x][y]) may be determined as (32>>((x<<1)>>nScale)), and the second weight wT[x] may be determined as (32>>((y<<1)>>nScale)). The third weight wTL[x][y] may be determined as ((wL[x]>>4)+(wT[y]>>4)). However, when the intra prediction mode is the planar mode, the third weight may be determined as 0. The scaling factor may be set to ((Log 2(nCbW)+Log 2(nCbH)−2)>>2).

When the intra prediction mode of the current block is the vertical/horizontal mode, the neighboring pixels (refL, refT) of the current pixel may belong to the first pixel line adjacent to the current block and may be located on the same horizontal/vertical line as the current pixel. In the vertical mode, the first weight wL[x] of the current pixel (predSample[x][y]) may be determined as (32>>((x<<1)>>nScale)), and the second weight (wT[y]) may be determined to be 0, and the third weight wTL[x][y] may be determined equal to the first weight. Meanwhile, in the horizontal mode, the first weight wL[x] of the current pixel (predSample[x][y]) may be determined to be 0, and the second weight wT[y] may be determined as (32>>((y<<1)>>nScale)), and the third weight wTL[x][y] may be determined equal to the second weight.

When the intra prediction mode of the current block is a diagonal mode, the neighboring pixels refL and refT of the current pixel may belong to a first pixel line adjacent to the current block and may be located on the same diagonal line as the current pixel. Here, the diagonal line has the same angle as the intra prediction mode of the current block. The diagonal line may mean a diagonal line from the bottom-left to the top-right, or may mean a diagonal line from the top-left to the bottom-right. In this case, the first weight wL[x] of the current pixel (predSample[x][y]) may be determined as (32>>((x<<1)>>nScale)), the second weight wT[y] may be determined as (32>>((y<<1)>>nScale)), and the third weight wTL[x][y] may be determined as 0.

When the intra prediction mode of the current block is equal to or less than the mode 10, the neighboring pixels (refL, refT) of the current pixel may belong to the first pixel line adjacent to the current block and may be located on the same diagonal line as the current pixel. Here, the diagonal line has the same angle as the intra prediction mode of the current block. In this case, the neighboring pixels may be limited so that only one of the left neighboring pixel or the top neighboring pixel of the current block is used. The first weight wL[x] of the current pixel (predSample[x][y]) may be determined to be 0, the second weight wT[y] may be determined as (32>>((y<<1)>>nScale)), and the third weight wTL[x][y] may be determined as 0.

When the intra prediction mode of the current block is equal to or greater than mode 58, the neighboring pixels refL and refT of the current pixel may belong to the first pixel line adjacent to the current block and may be located on the same diagonal line as the current pixel. Here, the diagonal line has the same angle as the intra prediction mode of the current block. In this case, the neighboring pixels may be limited so that only one of the left neighboring pixel or the top neighboring pixel of the current block is used. The first weight wL[x] of the current pixel (predSample[x][y]) may be determined as (32>>((x<<1)>>nScale)), the second weight wT[y] may be determined as 0, and the third weight wTL[x][y] may be determined as 0.

Based on the determined neighboring pixels (refL[x][y], refT[x][y]) and weights (wL[x], wT[y], wTL[x][y]), the current pixel (predSamples[x][y]) may be corrected as in Equation 1 below.

$$predSamples[x][y]=clip1Cmp((refL[x][y]*wL[x]+refT[x][y]*wT[y]-p[-1][-1]*wTL[x][y]+(64-wL[x]-wT[y]+wTL[x][y])*predSamples[x][y]+32)>>6) \quad \text{[Equation 1]}$$

However, the above-described correction process may be performed only when the current block does not perform intra prediction in units of sub-blocks. The correction process may be performed only when the neighboring pixels of the current block belong the first pixel line. The correction process may be performed only when the intra prediction mode of the current block corresponds to a specific mode. Here, the specific mode may include at least one of a non-directional mode, a vertical mode, a horizontal mode, a mode less than a predetermined first threshold mode, or a mode greater than a predetermined second threshold mode. The first threshold mode may be 8, 9, 10, 11, or 12, and the second threshold mode may be 56, 57, 58, 59, or 60.

Figure 6:
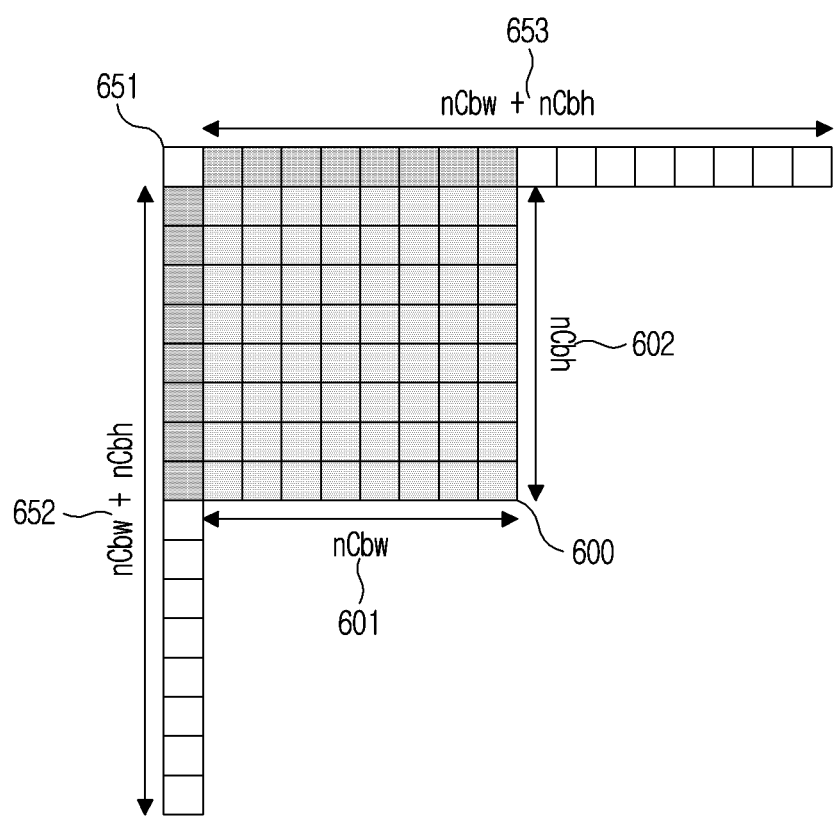
FIG. 6 is a diagram illustrating a configuration of a reference pixel for a DC mode among intra prediction modes according to an embodiment of the present invention.

FIG. 6 is a diagram illustrating a configuration of a reference pixel for a DC mode among intra prediction modes according to an embodiment of the present invention.

In order to calculate the DC value for the DC mode, the average value of the pixels spatially adjacent to the current block is defined as a DC value using Equation 2 and prediction is performed.

$$DC=(\Sigma_{i=0}^{nCw-1}R(i,-1)+\Sigma_{j=0}^{nCbh-1}R(-1,j)+((nCbw+nCbh)>>1))/(nCbw+nCbh) \quad \text{[Equation 2]}$$

In the case of using Equation 2, when the sum of nCbw and nCbh does not have a power of 2, a problem of performing a division operation occurs.

Accordingly, in the present invention, for a case where the sum of the width and the height of the block does not have a power of 2, we propose of removing the division operation in the form of calculating the average value of the left reference pixels of the block and the average value of the top reference pixels of the block using a shift operation as shown in Equation 3 below and then performing an average for them again.

$$DC=((\omega w \times (\Sigma_{i=0}^{nCbw-1}R(i,-1)+(nCbw>>1))\log_2(nCbw)))+(\omega h \times (\Sigma_{j=0}^{nCbh-1}R(-1,j)+(nCbh>>1))>>\log_2(nCbh))+1)>>\log_2(\omega w+\omega h) \quad \text{[Equation 3]}$$

In this case, ωw and ωh may be defined according to the size of the block, and predefined values may be used based on the size of the block, the difference between the width and the height of the block, etc. In Equation 3, as an embodiment of ωw and ωh, a weight value as shown in Table 7 may be used.

TABLE 7

| $|\log_2(nCbw) - \log_2(nCbh)|$ | $\omega_{max}$ | $\omega_{min}$ | $\omega_{max} + \omega_{min}$ |
|---|---|---|---|
| 1 | 21 | 11 | 32 |
| 2 | 26 | 6 | 32 |
| 3 | 28 | 4 | 32 |
| 4 | 30 | 2 | 32 |

In Table 7, the values of ωmax and ωmin mean the weight value of the side with the larger of the width of the block and the height of the block. In Table 7, the value of |log 2(nCbw)–log 2(nCbh)| means the logarithm of the absolute value of the difference between the width of the block and the height of the block.

In addition, the present invention proposes a video encoding and decoding method and apparatus for selectively deriving a DC value using different equations for cases where the sum of the width and the height of a block is expressed as a power of 2 or not. When the sum of the width and the height of the block is expressed as a power of 2, the DC value is derived using Equation 4, and when the sum of the width and the height of the block is not expressed as a power of 2, the DC value is derived using Equation 3.

$$DC=(\Sigma_{i=0}^{nCbw-1}R(i,-1)+\Sigma_{j=0}^{nCbh-1}R(-1,j)+((nCbw+nCbh)>>1))>>\log_2(nCbw+nCbh) \quad \text{[Equation 4]}$$

In addition, in the present invention, in order to selectively derive a DC value according to the width and the height of the block, a video encoding and decoding method and apparatus further comprising a determination unit for determining whether the sum of the width and the height of the block is a power of 2 are proposed.

Figure 7:
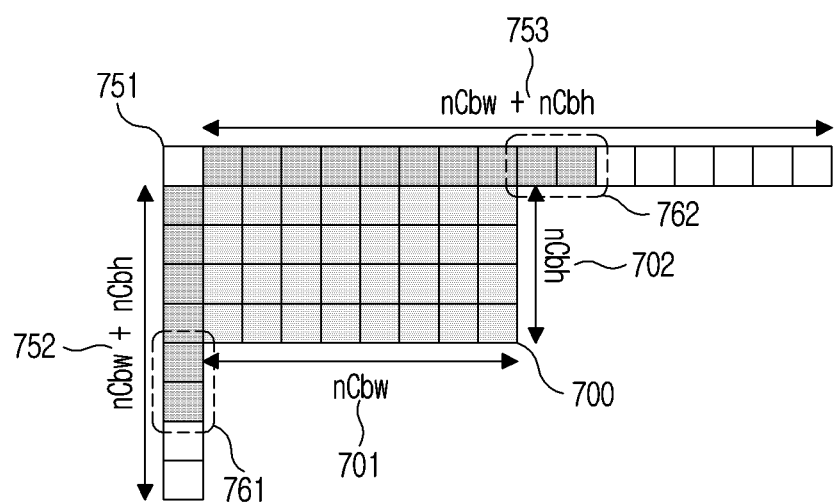
FIGS. 7 and 8 are a diagram illustrating a configuration of a reference pixel for a DC mode among intra prediction modes for a block having a size in which the sum of the width and the height of the block is not expressed as a power of 2 according to an embodiment of the present invention.

FIG. 7 is a diagram illustrating a configuration of a reference pixel for a DC mode among intra prediction modes for a block having a size in which the sum of the width and the height of the block is not expressed as a power of 2 according to an embodiment of the present invention.

A block having a size in which the sum of the width and the height of the block is not expressed as a power of 2 encompasses the case where the width and the height of the block are not the same. As described above, when the sum of the width and the height of the block is not expressed as a power of 2, a problem arises in that a division operation must be performed to calculate a DC value for the DC mode.

FIG. 7 is an embodiment different from the method of deriving the average value of the top reference pixels and the average value of the left reference pixels described in FIG. 6, respectively and weighting them. A method of increasing the width and the height of the block used to derive the DC value by a value resulting from dividing the shorter of the width and the height of the block by 2 is described.

In the embodiment illustrated in FIG. 7, when the sum of the width and the height of the block is not expressed as a power of 2 and the difference between the log value of the block width and the log value of the block height is 1, Equation 5 is used to calculate the DC value for the DC mode. The average value of the pixels spatially adjacent to the current block is defined as the DC value and prediction is performed.

$$DC=(\Sigma_{i=0}^{nCbw+(nCbm>>1)-1}R(i,-1)+\Sigma_{j=0}^{nCbh+(nCbm>>1)-1}R(-1,j)+((nCbw+nCbh+nCbm)>>1))>>\log_2(nCbw+nCbh+nCbm) \quad \text{[Equation 5]}$$

In Equation 5, nCbm means a value having the shorter length of the block width nCbw and the block height nCbh, and as shown in FIG. 7 and Equation 5, among the reference pixels at the top of the block, the reference pixel values of (nCbm>>1) are additionally summed to the width of the block. And, among the reference pixels at the left of the block, the reference pixel values of (nCbm>>1) are additionally summed to the height of the block. (nCbw+nCbh+nCbm) is expressed as a power of 2 through this operation.

Figure 8:
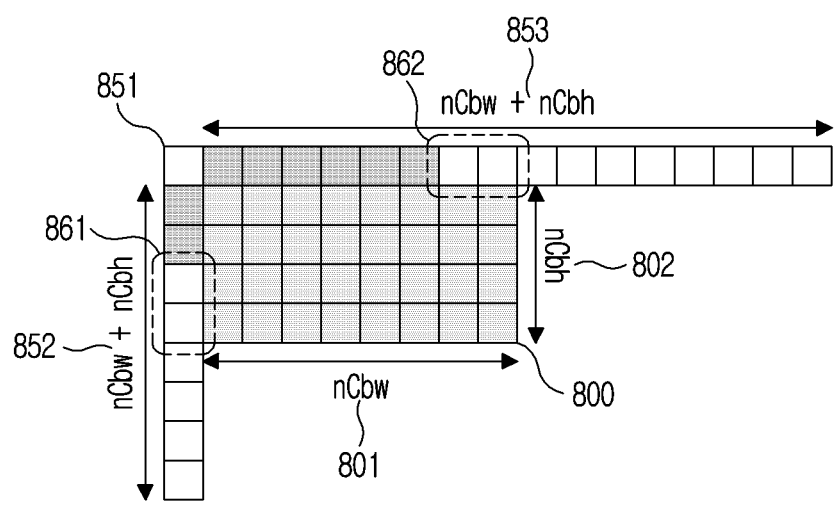

FIG. 8 is a diagram illustrating a configuration of a reference pixel for a DC mode among intra prediction modes for a block having a size in which the sum of the width and the height of a block is not expressed as a power of 2 according to an embodiment of the present invention.

Unlike that described in FIG. 7, FIG. 8 is related to an embodiment in which the difference between the log value of the block width and the log value of the block height is greater than or equal to 2. A method of decreasing the width and the height of the block used to derive the DC value by a value resulting from dividing the shorter of the width and the height of the block by 2 is described.

In the embodiment illustrated in FIG. 8, when the sum of the width and the height of the block is not expressed as a power of 2 and the difference between the log value of the block width and the log value of the block height is greater than or equal to 2, Equation 6 is used to calculate the DC value for the DC mode. The average value of the pixels spatially adjacent to the current block is defined as the DC value and prediction is performed.

$$DC = (\Sigma_{i=0}^{nCbw-(nCbm>>1)-1} R(i,-1) + \Sigma_{j=0}^{nCbh-(nCbm>>1)-1} R(-1,j) + ((nCbw+nCbh-nCbm)>>1)) >> \log_2(nCbw+nCbh-nCbm)$$ [Equation 6]

In Equation 6, nCbm means a value having the shorter length of the block width nCbw and the block height nCbh, and as shown in FIG. 8 and Equation 6, (nCbw+nCbh−nCbm) is expressed as a power of 2 by excluding reference pixel values of (nCbm>>1) in the width of the block from the summation among the reference pixels at the top of the block and excluding reference pixel values of (nCbm>>1) in the height of the block from the summation among the reference pixels at the left of the block.

In this case, when excluding pixels by (nCbm>>1) from the width of the block and the height of the block, as shown in FIG. 8, pixels may be excluded from the rightmost side of the top reference samples and from the bottommost of the left reference samples. In addition, another embodiment includes performing sub-sampling among the top reference samples and the left reference samples.

Various embodiments of the present disclosure are not listed in all possible combinations, but are intended to describe representative aspects of the present disclosure, and matters described in the various embodiments may be applied independently or may be applied in combination of two or more.

In addition, various embodiments of the present disclosure may be implemented by hardware, firmware, software, or a combination thereof. For implementation by hardware, it may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processor (general processor), a controller, a microcontroller, a microprocessor, or etc.

The scope of the present disclosure includes software or machine-executable instructions (e.g., operating systems, applications, firmware, programs, etc.) that allow an operation according to a method of various embodiments to be executed on a device or computer, and a non-transitory computer-readable medium (non-transitory computer-readable medium) which stores such software or instructions and is executable on a device or a computer.

INDUSTRIAL APPLICABILITY

The present invention may be used to encode/decode a video signal.

The invention claimed is:

1. A method of decoding a video, comprising:
    determining a current block by dividing a coding block in the video based on a tree-based block partitioning;
    deriving an intra prediction mode of the current block;
    generating a prediction block of the current block by performing intra prediction on the current block based on the intra prediction mode and reference pixels of the current block; and
    reconstructing the current block based on the prediction block,
    wherein, in response to a case where the intra prediction mode is a DC mode, a pixel of the current block is predicted as an average value of at least one of top reference pixels or left reference pixels belonging to the reference pixels,
    wherein, in response to a case where a width of the current block is equal to a height of the current block, the average value is calculated by performing a right shift operation using a first value on a sum of the top reference pixels, the left reference pixels and the width of the current block, the first value being the same as a logarithm of a sum of the width and the height of the current block to base 2, and
    wherein, in response to a case where the width of the current block is not equal to the height of the current block, the average value is calculated by performing a right shift operation using a second value on a sum of the top reference pixels and a half of the width of the current block, the second value being a logarithm of the width of the current block to base 2.

2. The method of claim 1, further comprising:
    obtaining, from a bitstream, a first flag indicating whether the current block uses a default mode,
    wherein, in response to the first flag indicating that the current block uses the default mode, the intra prediction mode of the current block is set to the default mode,
    wherein, in response to the first flag indicating that the current block does not use the default mode, the intra prediction mode of the current block is derived from a candidate list including a plurality of MPM candidates, and
    wherein the default mode is representative of a Planar mode and is not included in the candidate list.

3. The method of claim 2, wherein, in response to the first flag indicating that the current block does not use the default mode, the intra prediction mode of the current block is derived based on an MPM candidate specified by an MPM index among the plurality of MPM candidates in the candidate list, and
    wherein a number of the MPM candidates in the candidate list is 5.

4. The method of claim 3, wherein, in response to the intra prediction mode of the current block being a directional mode belonging to a pre-defined range, the intra prediction mode is modified by adding or subtracting a predetermined offset, and
    wherein, in response to a case where the modification of the derived intra prediction mode is performed, the intra prediction of the current block is performed based on the modified intra prediction mode and the reference pixels.

5. The method of claim 4, wherein the offset is applied only when the width of the current block is not equal to the height of the current block.

6. The method of claim 5, wherein the reference pixels belong to one of a plurality of pixel lines neighboring to the current block.

7. The method of claim 6, further comprising:
    filtering the reference pixels,
    wherein the filtering is selectively performed based on a second flag indicating whether the filtering is performed on the reference pixels, and
    wherein the second flag is derived based on at least one of a position/region of a pixel line to which reference pixels belong, a component type, or whether intra prediction in sub-block units is applied.

8. The method of claim 1, wherein, in response to the width of the current block is greater than the height of the current block, the pixel of the current block is predicted as an average value of the top reference pixels of the current block, and wherein, in response to the width of the current block is less than the height of the current block, the pixel of the current block is predicted as an average value of the left reference pixels of the current block.

9. The method of claim 8, wherein the predicted pixel of the current block is corrected based on a predetermined neighboring pixel and a weight.

10. The method of claim 1, wherein the current block is divided into a plurality of sub-blocks based on division information, and wherein the intra prediction is performed in units of the sub-blocks.

11. The method of claim 1, wherein the tree-based block partitioning includes at least one of a binary-tree partitioning or a ternary-tree partitioning, and wherein the binary-tree partitioning is a partitioning type of horizontally or vertically dividing one coding block into two coding blocks and the ternary-tree partitioning is a partitioning type of horizontally or vertically dividing one coding block into three coding blocks.

12. A method of encoding a video, comprising:

determining a current block by dividing a coding block in the video based on a tree-based block partitioning;

generating, based on an intra prediction mode of the current block and reference pixels of the current block, a prediction block of the current block by performing intra prediction on the current block, the intra prediction mode being one of a plurality of intra prediction modes pre-defined in an encoding apparatus; and generating a residual block of the current block by subtracting the prediction block from an original block, wherein, in response to a case where the intra prediction mode is a DC mode, a pixel of the current block is predicted as an average value of at least one of top reference pixels or left reference pixels belonging to the reference pixels, wherein, in response to a case where a width of the current block is equal to a height of the current block, the average value is calculated by performing a right shift operation using a first value on a sum of the top reference pixels, the left reference pixels and the width of the current block, the first value being the same as a logarithm of a sum of the width and the height of the current block to base 2, and wherein, in response to a case where the width of the current block is not equal to the height of the current block, the average value is calculated by performing a right shift operation using a second value on a sum of the top reference pixels and a half of the width of the current block, the second value being a logarithm of the width of the current block to base 2.

13. A method for transmitting comprising:

determining a current block by dividing a coding block based on a tree-based block partitioning;

generating, based on an intra prediction mode of the current block and reference pixels of the current block, a prediction block of the current block by performing intra prediction on the current block, the intra prediction mode being one of a plurality of intra prediction modes;

generating a residual block of the current block by subtracting the prediction block from an original block;

encoding the residual block of the current block to generate the bitstream; and transmitting the bitstream, wherein, in response to a case where the intra prediction mode is a DC mode, a pixel of the current block is predicted as an average value of at least one of top reference pixels or left reference pixels belonging to the reference pixels, wherein, in response to a case where a width of the current block is equal to a height of the current block, the average value is calculated by performing a right shift operation using a first value on a sum of the top reference pixels, the left reference pixels and the width of the current block, the first value being the same as a logarithm of a sum of the width and the height of the current block to base 2, and wherein, in response to a case where the width of the current block is not equal to the height of the current block, the average value is calculated by performing a right shift operation using a second value on a sum of the top reference pixels and a half of the width of the current block, the second value being a logarithm of the width of the current block to base 2, wherein, in response to a case where the intra prediction mode is a DC mode, a pixel of the current block is predicted as an average value of at least one of top reference pixels or left reference pixels belonging to the reference pixels, wherein, in response to a case where a width of the current block is equal to a height of the current block, the average value is calculated by performing a right shift operation using a first value on a sum of the top reference pixels, the left reference pixels and the width of the current block, the first value being the same as a logarithm of a sum of the width and the height of the current block to base 2, and wherein, in response to a case where the width of the current block is not equal to the height of the current block, the average value is calculated by performing a right shift operation using a second value on a sum of the top reference pixels and a half of the width of the current block, the second value being a logarithm of the width of the current block to base 2.

* * * * *